United States Patent
Agiwal et al.

(10) Patent No.: US 10,237,912 B2
(45) Date of Patent: Mar. 19, 2019

(54) METHOD AND APPARATUS FOR MANAGING RESOURCES FOR D2D COMMUNICATION

(71) Applicant: Samsung Electronics Co., Ltd, Gyeonggi-do (KR)

(72) Inventors: Anil Agiwal, Suwon-si (KR); Young-Bin Chang, Gyeonggi-do (KR); Kyung-Kyu Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 14/806,061

(22) Filed: Jul. 22, 2015

(65) Prior Publication Data

US 2016/0029359 A1  Jan. 28, 2016

(30) Foreign Application Priority Data

Jul. 22, 2014 (KR) .......................... 10-2014-0092270

(51) Int. Cl.
*H04W 76/36* (2018.01)
*H04W 72/04* (2009.01)
*H04W 76/14* (2018.01)
*H04W 36/00* (2009.01)
*H04W 92/18* (2009.01)
(Continued)

(52) U.S. Cl.
CPC ........... *H04W 76/36* (2018.02); *H04W 36/03* (2018.08); *H04W 72/04* (2013.01); *H04W 76/14* (2018.02); *H04W 8/005* (2013.01); *H04W 8/26* (2013.01); *H04W 12/06* (2013.01); *H04W 48/12* (2013.01); *H04W 72/042* (2013.01); *H04W 76/27* (2018.02); *H04W 92/18* (2013.01)

(58) Field of Classification Search
CPC ............. H04W 76/023; H04W 76/066; H04W 76/046; H04W 72/04; H04W 72/042; H04W 76/36; H04W 76/14; H04W 76/27
See application file for complete search history.

(56) References Cited

U.S. PATENT DOCUMENTS

2014/0018085 A1* 1/2014 Young ............... H04W 52/0235
455/450
2014/0321308 A1* 10/2014 Chen .................... H04W 36/02
370/252
(Continued)

*Primary Examiner* — Feben Haile

(57) ABSTRACT

The present disclosure relates to a communication method and system for converging a fifth generation (5G) communication system for supporting higher data rates beyond a fourth generation (4G) system with a technology for Internet of Things (IoT). The present disclosure applies to intelligent services based on 5G communications technology and IoT related technology, such as a smart home, smart building, smart city, smart car, connected car, health care, digital education, smart retail, and security and safety services. A method for managing resources for Device to Device (D2D) communication includes: establishing a radio connection with an evolved NodeB (eNB); receiving allocated resources for D2D communication from the eNB through the radio connection; performing the D2D communication by using the allocated resources in an idle state after the radio connection is released; and responsive to receiving a message from the eNB indicating a release of the allocated resources, releasing the allocated resources.

13 Claims, 8 Drawing Sheets

(51) Int. Cl.
*H04W 12/06* (2009.01)
*H04W 8/00* (2009.01)
*H04W 8/26* (2009.01)
*H04W 48/12* (2009.01)
*H04W 76/27* (2018.01)

(56) References Cited

U.S. PATENT DOCUMENTS

| | | | |
|---|---|---|---|
| 2015/0124735 A1* | 5/2015 | Cho | H04W 76/043 |
| | | | 370/329 |
| 2015/0124775 A1* | 5/2015 | Guo | H04W 8/005 |
| | | | 370/331 |
| 2015/0223048 A1* | 8/2015 | Al-Shalash | H04W 8/005 |
| | | | 370/254 |
| 2016/0014589 A1* | 1/2016 | Niu | H04W 74/02 |
| | | | 370/329 |

* cited by examiner

METHOD AND APPARATUS FOR MANAGING RESOURCES FOR D2D COMMUNICATION

CROSS-REFERENCE TO RELATED APPLICATION(S) AND CLAIM OF PRIORITY

The present application is related to and claims priority under 35 U.S.C. § 119(a) to Korean Application Serial No. 10-2014-0092270, which was filed in the Korean Intellectual Property Office on Jul. 22, 2014, the entire content of which is hereby incorporated by reference.

TECHNICAL FIELD

The present disclosure relates to a method and an apparatus for managing resources for Device to Device (D2D) communication.

BACKGROUND

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, due to the supply of smart phones, data traffic has rapidly increased. The number of users of smart phones will further increase and application services through the smart phones will become more activated. Accordingly, mobile data traffic is expected to increase much more than now. Particularly, when Machine to Machine (M2M) communication such as communication between a person and a machine and communication between machines that correspond to a new mobile market beyond communication between people is activated, traffic transmitted to an evolved NodeB (eNB) is expected to increase beyond that which can be handled.

Direct communication between devices is spotlighted at present as a technology to solve such problems. The technology called Device to Device (D2D) communication receives attention in both a licensed band used by cellular mobile communication and an unlicensed band used by communication such as wireless LAN.

When the D2D communication is combined with the cellular mobile communication, an increase in traffic capacity and a decrease in overload of the eNB are worthy of notice. That is, when User Equipments (UEs) (or Mobile Stations (MSs)) within the same cell or adjacent cells configure a D2D link therebetween and then directly exchange data through the D2D link without passing through an evolved NodeB (eNB) (or Base Station (BS)), a communication path may decrease from two links (that is, a link from the UE to the eNB and another link from the eNB to another UE) to one link.

A discovery between UEs for D2D communication and various processes for allowing a data communication service are being researched by communication standard groups. The discovery refers to a process which a D2D-enabled UE uses to determine whether another D2D-enabled UE is located close to the D2D-enabled UE. The D2D-enabled UE discovers other neighboring D2D-enabled UEs by using direct UE-to-UE signaling.

In a Frequency Division Duplex (FDD) system, the D2D communication may be performed in an UpLink (UP) frequency band. One of the methods of allocating resources to D2D UEs for transmission uses dedicated signaling between the D2D UE and the eNB. The D2D UE which is interested in transmission makes a request for dedicated resources to the eNB, and the eNB allocates the dedicated resources for transmission to the D2D UE. The resource request and assignment of resources takes place in connected state wherein UE and eNB are connected to each other. If no communication with eNB on data radio bearers is going on then BS can release the connection and UE can use the assigned resources in idle state.

Particularly, D2D resources allocated for the discovery may have been allocated to UEs for a long period through a semi persistent method. When the eNB desires to use the allocated resources for another purpose, a method of releasing the resources is required. Further, when the UE moves to an area of another eNB, a method of releasing the resources by a source eNB is required.

SUMMARY

To address the above-discussed deficiencies, it is a primary object to provide, for use in a method and an apparatus for managing resources for D2D communication.

The present disclosure provides a method and an apparatus for releasing dedicated resources allocated for D2D communication.

The present disclosure provides a method and an apparatus for releasing D2D resources for a discovery.

In accordance with an aspect of the present disclosure, a method of managing resources for Device to Device (D2D) communication is provided. The method includes: establishing a radio connection with an evolved NodeB (eNB); receiving resources for D2D communication from the eNB through the radio connection; performing the D2D communication by using the allocated resources in an idle state after the radio connection is released; and when a message indicating a release of the allocated resources is received from the eNB, releasing the allocated resources.

In accordance with another aspect of the present disclosure, a method of managing resources for Device to Device (D2D) communication is provided. The method includes: establishing a radio connection with a User Equipment (UE); allocating resources for D2D communication to the UE through the radio connection; maintaining a mapping table of the allocated resources and a UE identification of the UE; broadcasting a message indicating a release of the allocated resources after the radio connection is released; and releasing the allocated resources after the message is broadcasted.

In accordance with another aspect of the present disclosure, a method of managing resources for Device to Device (D2D) communication is provided. The method includes: establishing a radio connection with an evolved NodeB (eNB); receiving resources for D2D communication from the eNB through the radio connection; inspecting whether the allocated resources exist in a resource pool acquired from system information broadcasted by the eNB; when the allocated resources exist in the resource pool, performing the D2D communication by using the allocated resources; and, when the allocated resources do not exist in the resource pool, releasing the allocated resources.

In accordance with another aspect of the present disclosure, a method of managing resources for Device to Device (D2D) communication is provided. The method includes: establishing a radio connection with a User Equipment (UE); allocating resources for D2D communication to the UE through the radio connection; inserting a resource pool including information on the allocated resources into system information and broadcasting the system information; and, when it is determined to release the allocated resources, removing the information on the allocated resources from the resource pool, and inserting the resource pool into the system information and broadcasting the system information.

In accordance with another aspect of the present disclosure, a User Equipment (UE) apparatus managing resources for Device to Device (D2D) communication is provided. The UE apparatus includes: a transceiver that communicates a radio signal with an evolved NodeB (eNB); and a controller that controls the transceiver, establishes a radio connection with the eNB, receives resources for D2D communication from the eNB through the radio connection, performs the D2D communication by using the allocated resources in an idle state after the radio connection is released, and, when a message indicating a release of the allocated resources is received from the eNB, releases the allocated resources.

In accordance with another aspect of the present disclosure, an evolved NodeB (eNB) apparatus managing resources for Device to Device (D2D) communication is provided. The eNB apparatus includes: a radio transceiver that communicates a radio signal with a User Equipment (UE); and a controller that controls the radio transceiver, establishes a radio connection with the UE, allocates resources for D2D communication to the UE through the radio connection, maintains a mapping table of the allocated resources and a UE identification of the UE, broadcasts a message indicating a release of the allocated resources after the radio connection is released, and releases the allocated resources after the message is broadcasted.

In accordance with another aspect of the present disclosure, a User Equipment (UE) apparatus managing resources for Device to Device (D2D) communication is provided. The UE apparatus includes: a transceiver that communicates a radio signal with an evolved NodeB (eNB); and a controller that controls the transceiver, establishes a radio connection with the eNB, receives resources for D2D communication from the eNB through the radio connection, inspects whether the allocated resources exist in a resource pool acquired from system information broadcasted by the eNB, performs the D2D communication by using the allocated resources when the allocated resources exist in the resource pool, and releases the allocated resources when the allocated resources do not exist in the resource pool.

In accordance with another aspect of the present disclosure, an evolved NodeB (eNB) apparatus managing resources for Device to Device (D2D) communication is provided. The eNB apparatus includes: a radio transceiver that communicates a radio signal with a User Equipment (UE); and a controller that controls the radio transceiver, establishes a radio connection with the UE, allocates resources for D2D communication to the UE through the radio connection, inserts a resource pool including information on the allocated resources into system information and broadcasts the system information, and, when it is determined to release the allocated resources, removes the information on the allocated resources from the resource pool, and inserts the resource pool into the system information and broadcasts the system information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
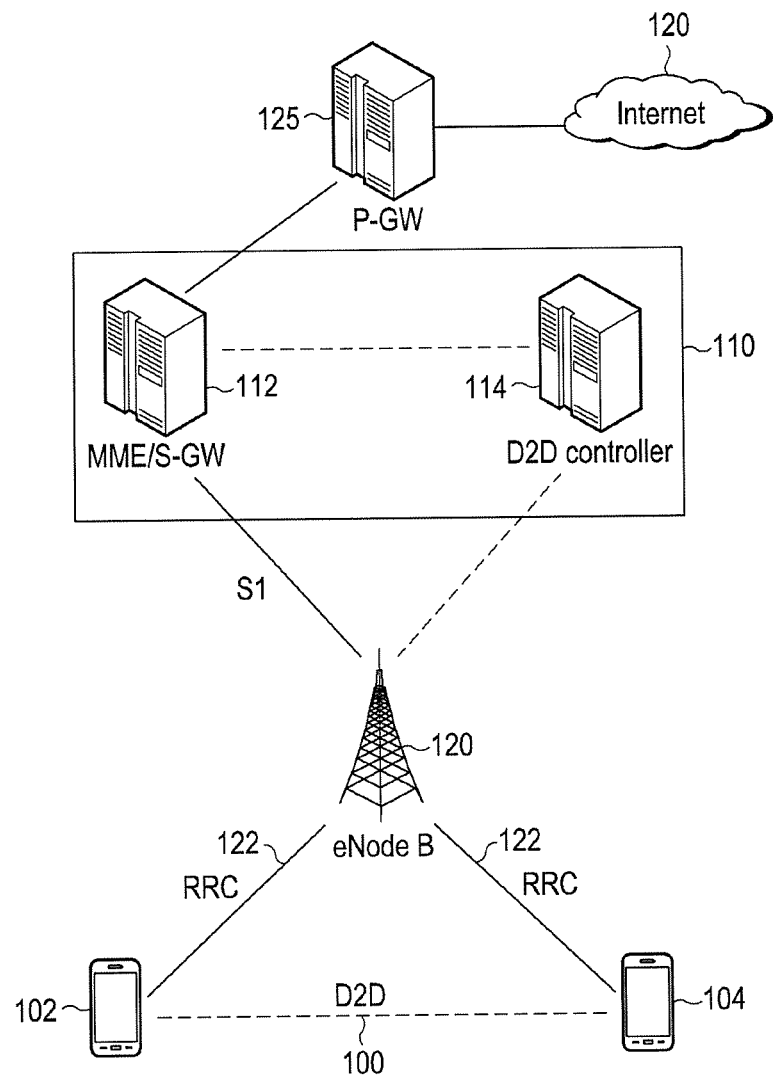
FIG. 1 illustrates a structure of a communication system supporting D2D communication according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions can also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions can also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Although the detailed description of embodiments of the present specification will be made mainly based on an OFDM-based wireless communication system, the subject matter of the present specification can be applied to other communication systems and services having the similar technical background and channel form without departing from the scope of the present specification, and the application can be determined by those skilled in the art.

FIG. 1 illustrates a structure of a communication system supporting D2D communication according to an embodiment of the present disclosure.

Referring to FIG. 1, an eNB 120 and a plurality of UEs 102 and 104 exist within the network. The eNB 120 is a subject communicating with the UEs 102 and 104, and can be referred to as a Base Station (BS), a NodeB (NB), an Access Point (AP) or the like. The UE 102 or 104 is a subject communicating with the eNB 120, and can be referred to as a device, a Mobile Station (MS), a Mobile Equipment (ME), a terminal, or the like.

Each of the UEs 102 and 104 can be in a Radio Resource Control (RRC) IDLE state in which there is no connection establishment between the UE 102 or 104 and any eNB or an RRC CONNECTED state in which the UE 102 or 104 is connected to one eNB. The UE in the RRC IDLE state selects an eNB (or a cell), monitors a paging channel, and acquires System Information (SI), but does not exchange data with the eNB. The UE in the RRC CONNECTED state can monitor a control channel and exchange data with the eNB 120 through a data channel. The UE can report various measurement results of the eNB 120 and adjacent eNBs to assist in scheduling of the eNB 120.

For example, each of the UEs 102 and 104 can establish a link with the eNB 120 to communicate through the eNB 120, and synchronize with the eNB 120. In another example, the UEs 102 and 104 located inside the network area or outside the network area can directly communicate through D2D links without passing through an eNB. To this end, the UEs 102 and 104 can synchronize with each other. The UEs 102 and 104 can be UEs (that is, cellular UEs), which can communicate with the eNB and support D2D communication, or UEs (that is, UEs dedicated for D2D communication), which cannot support cellular communication but can support D2D communication.

Both the UEs 102 and 104 can be located within the cell covered by one eNB 120, or the UEs 102 and 104 can be located within cells covered by different eNBs, respectively. All or at least one of the UEs 102 and 104 can access a core network 110 of a broadband system through the eNB 120 and receive supporting of D2D communication by the core network 110.

A D2D interface 100 for D2D communication between the UEs 102 and 104 defines end points of the communication as the UEs 102 and 104, and is used for exchanging control messages and/or data used for the communication between the UEs 102 and 104. At least one of the UEs 102 and 104 can have an RRC interface 122 for a connection with the eNB 120 separately from the D2D interface 100, and the interfaces 100 and 122 can operate independently from each other or dependently on each other.

The core network 110 of the broadband system includes a Mobility Management Entity (MME) 112 and a D2D controller 114. The MME 112 can manage mobility of the UEs 102 and 104 through the eNB 120, and can have a Serving GateWay (S-GW) function, which controls a mobile communication service of the UEs 102 and 104 according to a system configuration. The S-GW function of the MME 112 serves to connect the UEs 102 and 104 to the Internet 120 through a Packet GateWay (P-GW) 125.

The D2D controller 114 can control and manage D2D communication for the UEs 102 and 104. A function of the D2D controller 114 is largely divided into provisioning and matching. The provisioning function approves the use of D2D communication by the UEs 102 and 104 under supporting of the broadband network 110 and additionally provides security and charges for safe communication and D2D control. The matching function supports the UEs 102 and 104 to discover other UEs, which have identical or similar interest, under the assistance of the network in order to minimize computing of the UEs and power consumption in the discovery for D2D communication. Although the D2D controller 114 is illustrated herein as a separate independent entity, the D2D controller 114 is a logical entity and can be combined with another network entity, for example, the MME 112 according to another embodiment.

Each UE supporting D2D communication can determine whether another UE, which can perform the D2D communication, exists close to the UE. To this end, each D2D UE transmits a discovery signal. The discovery signal is used to recognize the existence of other D2D UEs close to the D2D UE. The D2D UE transmits its own discovery signal based on a time preset for transmission/reception of the discovery signal and through a predetermined area of frequency resources, and attempts to detect discovery signals transmitted from other D2D UEs in the remaining areas of the resources for transmission/reception of the discovery signal. Thereafter, the D2D UE determines whether the D2D UE corresponding to the detected discovery signal closely exists within the resources in which the detection is attempted. The discovery signal can include a message containing information related to the UE, which transmits the discovery signal, and a Demodulation Reference Signal (DMRS), which is used for demodulating the message, and bits included in a message block can be scrambled before the demodulation. The aforementioned discovery can be performed between D2D UEs included in different eNB service areas, and the discovery between UEs in the RRC CONNECTED state and the RRC IDLE state could be supported.

The D2D UE can perform a D2D discovery process according to execution of an authenticated application. For example, when a social networking application is enabled, the D2D discovery process can be used. The D2D UE, which executes the social network application, can discover a neighboring D2D UE, in which the D2D UE is interested, and can be discovered by the neighboring D2D UE, in which the D2D UE is interested. In another example, the D2D UE can discover nearby stores/restaurants, in which the D2D UE is interested, by using a discovery application. The D2D UE discovers other neighboring D2D UEs by using direct UE-to-UE signaling.

Figure 2:
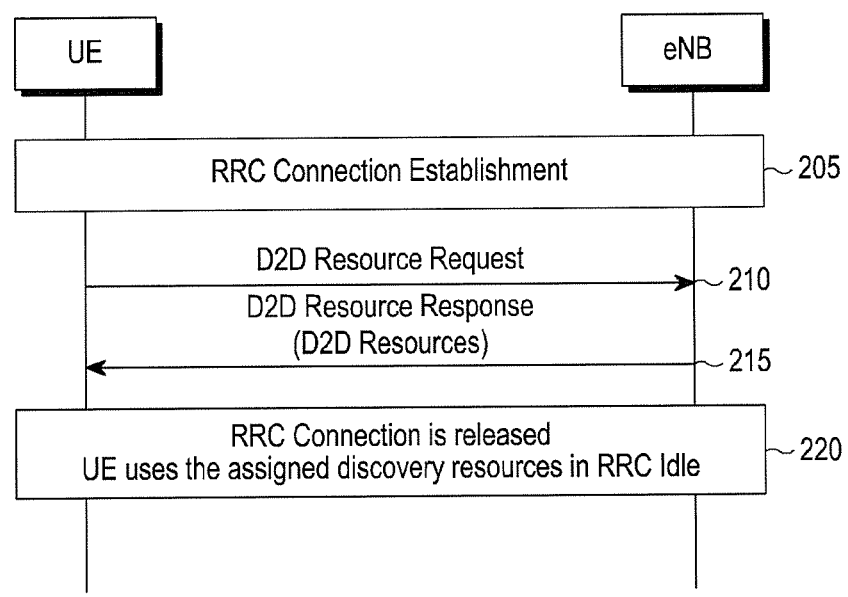
FIG. 2 illustrates a process for allocating D2D resources according to an embodiment of the present disclosure.

FIG. 2 illustrates a process for allocating D2D resources according to an embodiment of the present disclosure.

Referring to FIG. 2, the UE establishes an RRC connection with the eNB in operation 205. When the UE is interested in D2D transmission, the UE transmits a D2D resource request message in a CONNECTED state in order to make a request for dedicated resources for D2D transmission, particularly, a discovery signal in operation 210, and the eNB transmits a D2D resource response message to allocate the dedicate resources for the D2D transmission to the UE in operation 215. The D2D resource request message and the D2D resource response message correspond to dedicated signaling between the UE and the eNB and can occur in the CONNECTED state in which the UE and the eNB are connected to each other. The allocated dedicated resources for D2D transmission are practically semi persistent. In operation 220, the UE can perform the D2D transmission by using the allocated dedicated resources even after the RRC connection is released (i.e. UE is in the IDLE state).

In the CONNECTED state if there is no communication between the UE and the eNB, the eNB can release the RRC connection, and the UE can use the allocated dedicated resources for D2D transmission in the IDLE state.

Hereinafter, embodiments for releasing D2D resources will be described.

Figure 3:
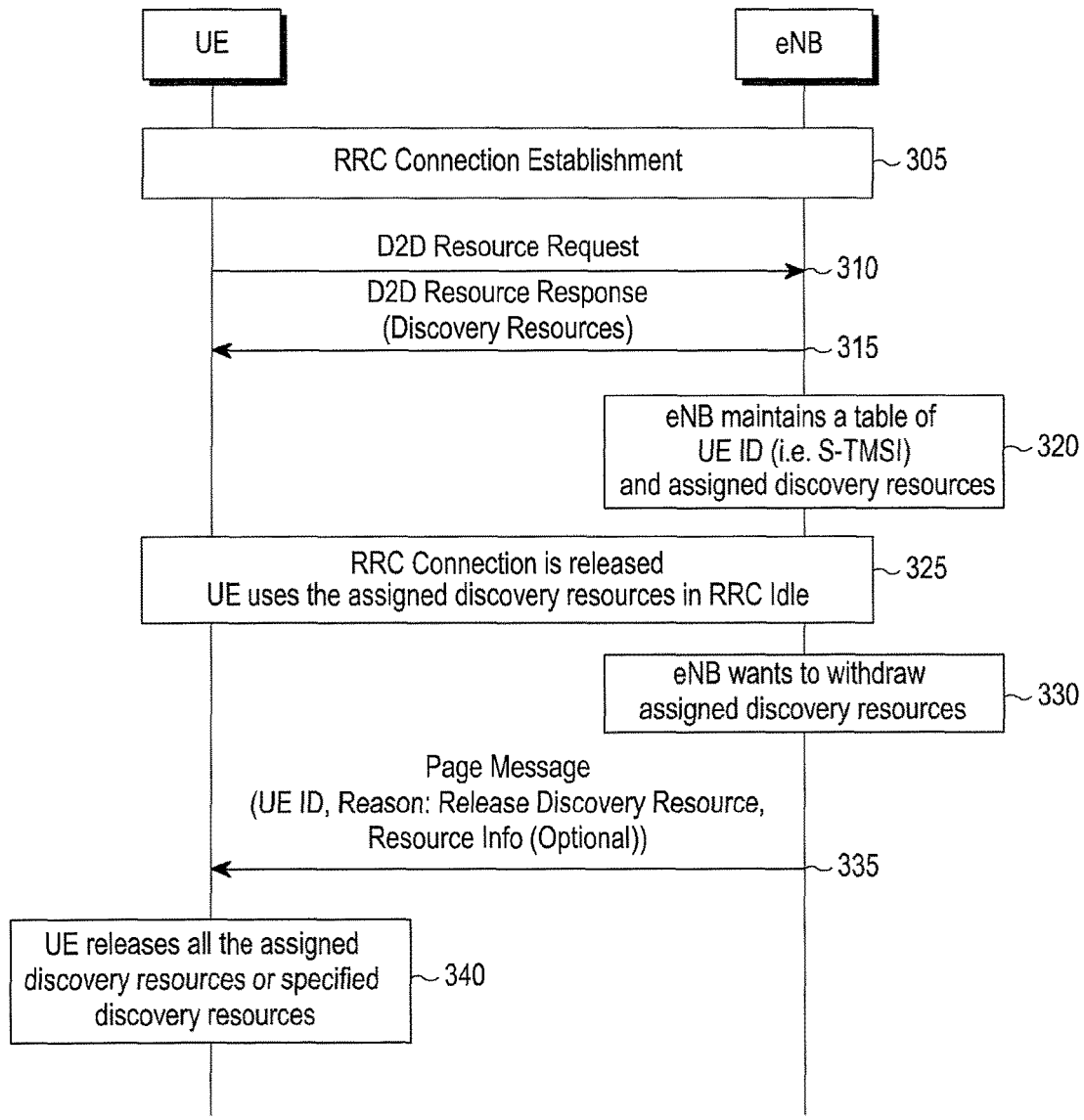
FIG. 3 illustrates a process for releasing D2D resources according to an embodiment of the present disclosure.

FIG. 3 illustrates a process for releasing D2D dedicated resources used by UE in IDLE state according to an embodiment of the present disclosure.

Referring to FIG. 3, the UE establishes the RRC connection with the eNB in operation 305. In order to establish the RRC connection, the UE transmits an RRC connection request message to the eNB. System Architecture Evolution (SAE) Temporary Mobile Subscriber Identity (S-TMSI) or some other UE identity is sent in RRC connection request message. The eNB responds to the request by transmitting an RRC connection setup message, and establishes the RRC connection for the UE. The eNB stores the S-TMSI or a UE identity. When the UE context received from the MME indicates that the UE has a D2D capability and/or indicates that the UE is authenticated for the D2D transmission, the eNB does not discard the S-TMSI/UE identity. When the RRC connection is released before the eNB receives the UE context from the MME, the eNB discards the S-TMSI/UE identity.

According to an embodiment, when the RRC connection is established for D2D transmission, the RRC connection request message can include a specific connection type, and the UE identity. The UE identity can be a permanent ID, for example, an International Mobile Subscriber Identity (IMSI). According to another embodiment, the UE identity can be sent in the D2D resource request message of operation 310 described below to the eNB.

The UE transmits the D2D resource request message to the eNB in RRC Connected state in operation 310, and the eNB allocates dedicated resources for D2D transmission, for example, discovery resources to the UE by transmitting the D2D resource response message indicating resources to be used for transmitting discovery signal to the UE in operation 315. The eNB maintains a table in which the UE identification (for example, S-TMSI or IMSI) and the allocated dedicated resources are mapped to each other in operation 320. The table is used for supporting use of the allocated dedicated resources for D2D transmission in the IDLE state. The table is maintained for the UE including the allocated dedicated resources wherein the allocated dedicated resources are effective even when the UE enters the IDLE state. That is, the eNB maintains the table of mapping between D2D dedicated resources of the UE and UE Identity even after the UE enters the IDLE state.

In operation 325, the RRC connection is released and the UE use the allocated dedicated resources for transmitting discovery signal even after the RRC connection is released.

In operation 330, the eNB can determine to withdraw the allocated resources. For example, the eNB can determine to withdraw the resources in order to allocate the resources to another UE. In another example, the eNB can determine to withdraw the resources in order to reduce loads and power consumption of the eNB. In another example, when a predetermined time passes after the RRC connection of the UE is released, the eNB can determine to withdraw the resources.

In operation 335, the eNB transmits a paging message with a UE identification of the UE including the resources for the D2D transmission and/or a reason code. The UE identification can be, for example, the S-TMSI. The reason code can indicate the release of the resources for the D2D transmission. Further, the paging message can further include resource information specifically indicating resources to be released selectively. The paging message can be transmitted once or repeatedly by a predetermined number of times by the eNB. After completing the (repetitive) transmission of the paging message, the eNB considers that the allocated resources of the UE are released. That is, the eNB can release the resources and re-allocate the resources for another purpose.

When the UE receives the paging message indicating the release of the resources for the D2D transmission and including its UE identification, the UE releases all the allocated dedicated resources or the resources specified by the paging message in operation 340.

According to a modified embodiment, the eNB can transmit a new message, for example, a discovery resource release message instead of the paging message in operation 335. The message can be masked by a specific identification, for example, a Radio Network Temporary Identity (RNTI) and transmitted through a Physical Downlink Control Channel (PDCCH).

According to another modified embodiment, before transmitting the paging message in operation 335, the eNB can make a request for paging parameters, for example, an idle cycle of the UE and a paging duration to the MME. The eNB can provide the UE identification, (example S-TMSI) to the MME to allow the MME to identify the UE. The eNB may know the MME, which manages the UE, based on an MME ID received from the UE while the RRC connection is established. When the eNB is informed that the MME does not manage the UE any more in response to the request for the paging parameters, the eNB may not transmit the paging message and may release the allocated resources.

When the dedicated resources for the D2D transmission, for example, discovery resources, are allocated to the UE and the UE uses the dedicated resources in the RRC IDLE state, the UE may select a new eNB and move to the new eNB. In this embodiment, the UE can transmit a D2D resource release message including information about the previous eNB and the UE identification of the UE to the new eNB. According to another embodiment, the resource release can be indicated in a request for D2D resources to the new eNB. The new eNB transmits the D2D resource release message to the previous eNB. The previous eNB releases the resources allocated in accordance with the UE identification included in the D2D resource release message. According to another embodiment, the D2D resource release message can be transmitted from the new eNB to the previous eNB through the MME.

The UE can determine an eNB identification to be used for transmitting the D2D resource release message in broadcast information acquired from the previous eNB or acquire the eNB identification when receiving the dedicated resources from the previous eNB. The eNB identification is included in the D2D resource release message transmitted to the new eNB.

Figure 4:
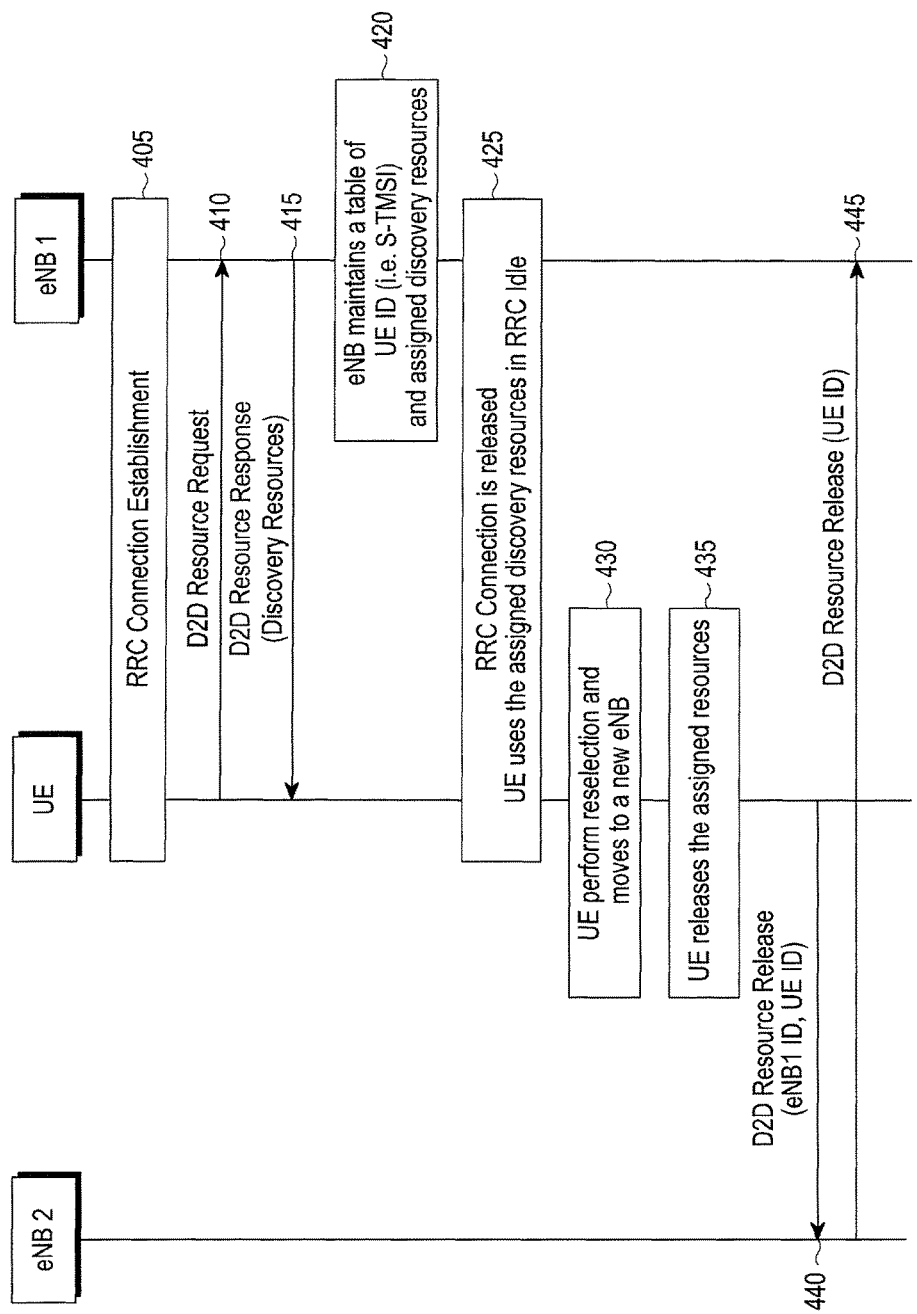
FIG. 4 illustrates a process for releasing D2D resources according to another embodiment of the present disclosure.

FIG. 4 illustrates a process for releasing D2D resources used by UE in IDLE state according to an embodiment of the present disclosure.

Referring to FIG. 4, the UE establishes the RRC connection with the eNB in operation 405. In order to establish the RRC connection, the UE transmits the RRC connection request message to the eNB. The UE identity (example S-TMSI) is sent to eNB in RRC Connection request message. The eNB responds to the request by transmitting the RRC connection setup message, and establishes the RRC connection for the UE. The eNB stores the UE Identity/S-TMSI of the UE. When the UE context received from the MME indicates that the UE has a D2D capability and/or indicates that the UE is authenticated for the D2D transmission, the eNB does not discard the S-TMSI/UE Identity. When the RRC connection is released before the eNB receives the UE context from the MME, the eNB discards the S-TMSI/UE identity.

The UE transmits the D2D resource request message to the eNB in a connected state in operation 410, and the eNB allocates dedicated resources for D2D transmission, for example, discovery resources to the UE by transmitting the D2D resource response message indicating resources to be used for transmitting the discovery signal to the UE in operation 415. The eNB maintains a table in which the UE identification (for example, S-TMSI or IMSI) and the allocated resources are mapped to each other in operation 420. The table is used for supporting use of dedicated resources for D2D transmission in the IDLE state. The table is maintained for all the UEs including the allocated dedicated resources, wherein allocated dedicated resources are effective even when the corresponding UE enters the IDLE state.

In operation 425, RRC connection is released and the UE can use the allocated resources for the discovery process for the D2D transmission even after the RRC connection is released.

In operation 430, the UE performs cell re-selection and moves to a new eNB (or a target eNB) and, accordingly, the eNB becomes a previous eNB (or a source eNB). After moving to the new eNB, the UE releases the allocated dedicated resources, which have been used by the previous eNB, in operation 435.

In operation 440, the UE transmits the D2D resource release message including identification information of the previous eNB and the UE identification to the new eNB. The D2D resource release can be indicated in a request for D2D resources to the new eNB. The resource information indicating the allocated resources, which have been used by the previous eNB can also be indicated in request for D2D resources to the new eNB. The new eNB transmits the D2D resource release message to the previous eNB in operation 445. When transmitted to the previous eNB, the D2D resource release message can include the UE identification except for the identification information of the previous eNB, and can further include resource information indicating the allocated resources, which have been used by the previous eNB. The D2D resource release message can be transmitted through an interface between the eNBs or transmitted from the new eNB to the previous eNB through the MME. The previous eNB withdraws the resources allocated to the UE in response to the D2D resource release message, such that the resources can be used for another purpose.

Figure 5:
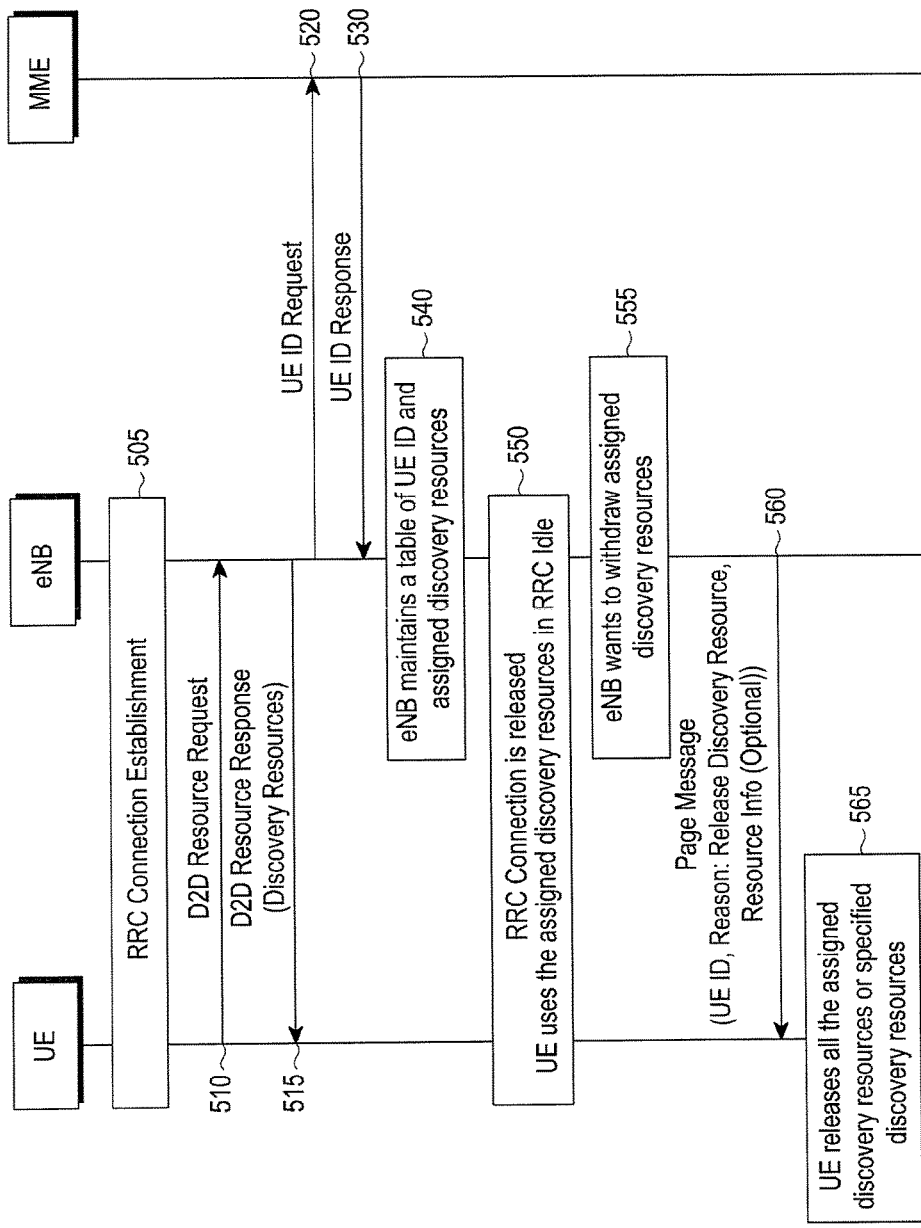
FIG. 5 illustrates a process for releasing D2D resources according to another embodiment of the present disclosure.

FIG. 5 illustrates a process for releasing D2D resources used by UE in IDLE state according to an embodiment of the present disclosure.

Referring to FIG. 5, the UE establishes the RRC connection with the eNB in operation 505. In order to establish the RRC connection, the UE transmits the RRC connection request message to the eNB. The eNB responds to the request by transmitting the RRC connection setup message, and establishes the RRC connection for the UE.

The UE transmits the D2D resource request message to the eNB in a connected state in operation 510, and the eNB allocates dedicated resources for D2D transmission, for example, discovery resources to the UE by transmitting the D2D resource response message indicating resources to be used for the discovery to the UE in operation 515.

In operation 520, the eNB transmits a request message making a request for a UE identification of the UE having the RRC connection in the RRC CONNECTED state and/or paging parameters to the MME. For the UE in the RRC CONNECTED state, the request message is transmitted between the MME and the eNB through the established signaling connection. In operation 530, the MME transmits a response message including the UE identification and/or the paging parameters to the eNB. It is to be noted that operation 520 can be performed after operation 510 in alternate embodiment.

The eNB maintains a table in which the UE identification (for example, S-TMSI or IMSI) and the allocated resources are mapped to each other in operation 540. The table is used for supporting the use of the allocated dedicated resources in the IDLE state. The table is maintained for all the UEs including the allocated dedicated resources, and the allocated dedicated resources are effective even when the corresponding UE enters the IDLE state.

In operation 550, RRC connection is released and the UE can use the allocated resources for the discovery transmission even after the RRC connection is released.

In operation 555 the eNB may determine to withdraw the allocated dedicated resources. Then, the eNB transmits a paging message with the UE identification of the UE including the resources for the D2D communication and/or a reason in operation 560. The UE identification can be, for example, the S-TMSI. The reason can indicate the release of the resources for the D2D communication. Further, the paging message can further include resource information specifically indicating resources to be released selectively. The paging message can be transmitted once or repeatedly by a predetermined number of times by the eNB. After completing the (repetitive) transmission of the paging message, the eNB considers that the resources of the UE are released.

When the UE receives the paging message indicating the release of the resources for the D2D communication and including its UE identification, the UE releases all the allocated resources or the resources specified by the paging message in operation 565.

According to a modified embodiment, the eNB can transmit a new message, for example, a discovery resource release message instead of the paging message in operation 560. The message can be masked by a specific identification, for example, aRNTI and transmitted through a PDCCH.

Figure 6:
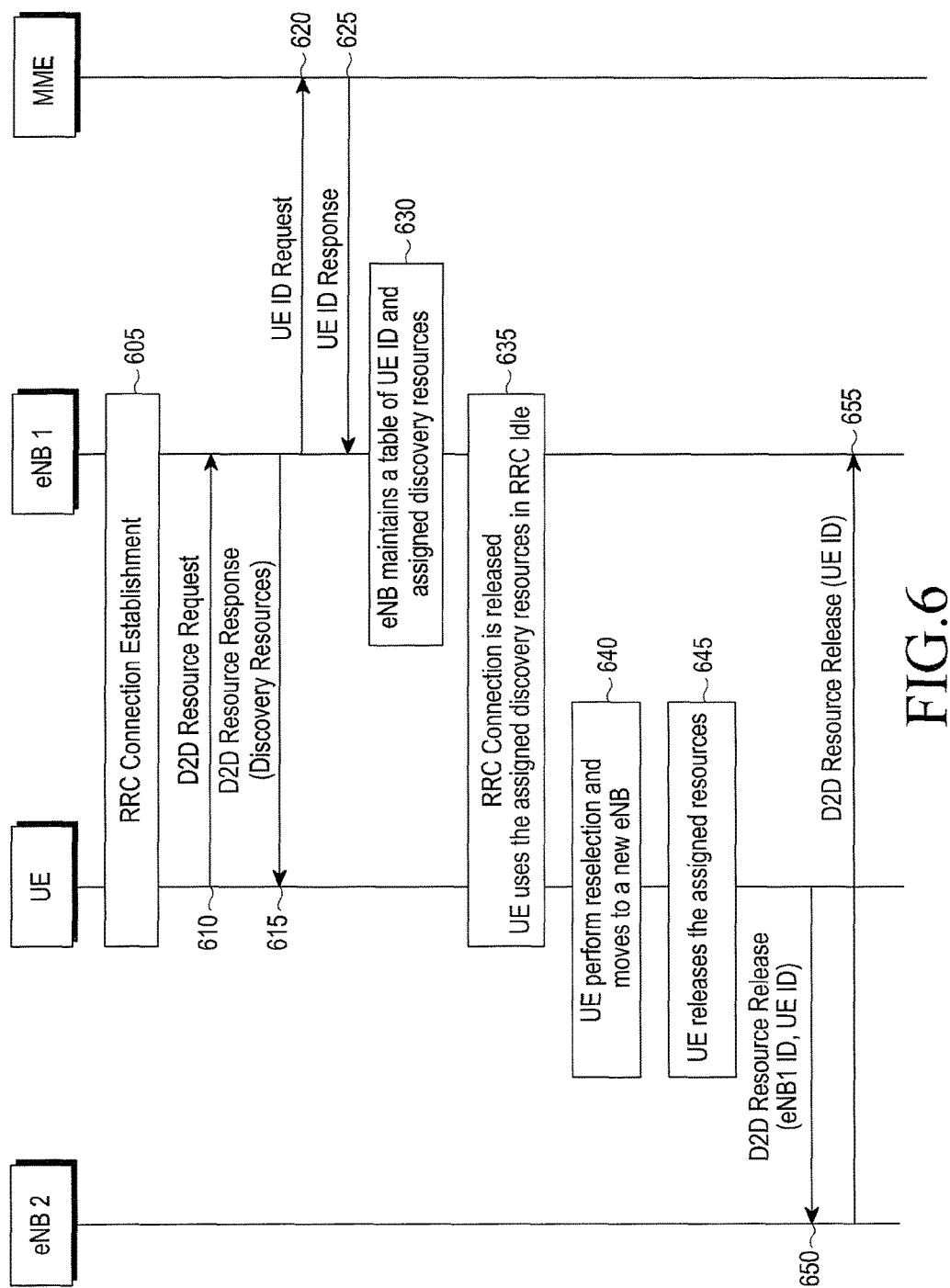
FIG. 6 illustrates a process for releasing D2D resources according to another embodiment of the present disclosure.

FIG. 6 illustrates a process for releasing D2D resources according to an embodiment of the present disclosure.

Referring to FIG. 6, the UE establishes the RRC connection with the eNB in operation 605. In order to establish the RRC connection, the UE transmits the RRC connection request message to the eNB. The eNB responds to the request by transmitting the RRC connection setup message, and establishes the RRC connection for the UE.

The UE transmits the D2D resource request message to the eNB through the RRC connection in operation 610, and the eNB allocates dedicated resources for D2D communication, for example, discovery resources to the UE by transmitting the D2D resource response message indicating resources to be used for the discovery process of the D2D communication to the UE in operation 615.

In operation 620, the eNB transmits a request message making a request for a UE identification of the UE having the RRC connection in the RRC CONNECTED state and/or paging parameters to the MME. For the UE in the RRC CONNECTED state, the request message is transmitted between the MME and the eNB through the established signaling connection. In operation 625, the MME transmits a response message including the UE identification and/or the paging parameters to the eNB. It is to be noted that operation 620 can be performed after operation 610 in alternate embodiment.

The eNB maintains a table in which the UE identification (for example, S-TMSI or IMSI) and the allocated resources are mapped to each other in operation 630. The table is used for supporting use of dedicated resources for D2D transmission in the IDLE state. The table is maintained for all the UEs including the allocated dedicated resources, wherein the allocated dedicated resources are used even when the corresponding UE enters the IDLE state.

In operation 635, RRC connection is released and the UE can use the allocated resources for the discovery process for the D2D communication even after the RRC connection is released.

In operation 640, the UE performs cell re-selection and moves to a new eNB (or a target eNB) and, accordingly, the eNB becomes a previous eNB (or a source eNB). After moving to the new eNB, the UE releases the allocated resources, which have been used by the previous eNB, in operation 645.

In operation 650, the UE transmits the D2D resource release message including identification information of the previous eNB and the UE identification to the new eNB. The D2D resource release message may be indicated in a request for D2D resources to the new eNB. The resource information indicating the allocated resources, which have been used by the previous eNB can also be included in the resource request. The new eNB transmits the D2D resource release message to the previous eNB in operation 655. When transmitted to the previous eNB, the D2D resource release message can include the UE identification except for the identification information of the previous eNB, and can further include resource information indicating the allocated resources, which have been used by the previous eNB. The D2D resource release message can be transmitted through an interface between the eNBs or transmitted from the new eNB to the previous eNB through the MME. The previous eNB withdraws the resources allocated to the UE in response to the D2D resource release message, such that the resources can be used for another purpose.

Figure 7:
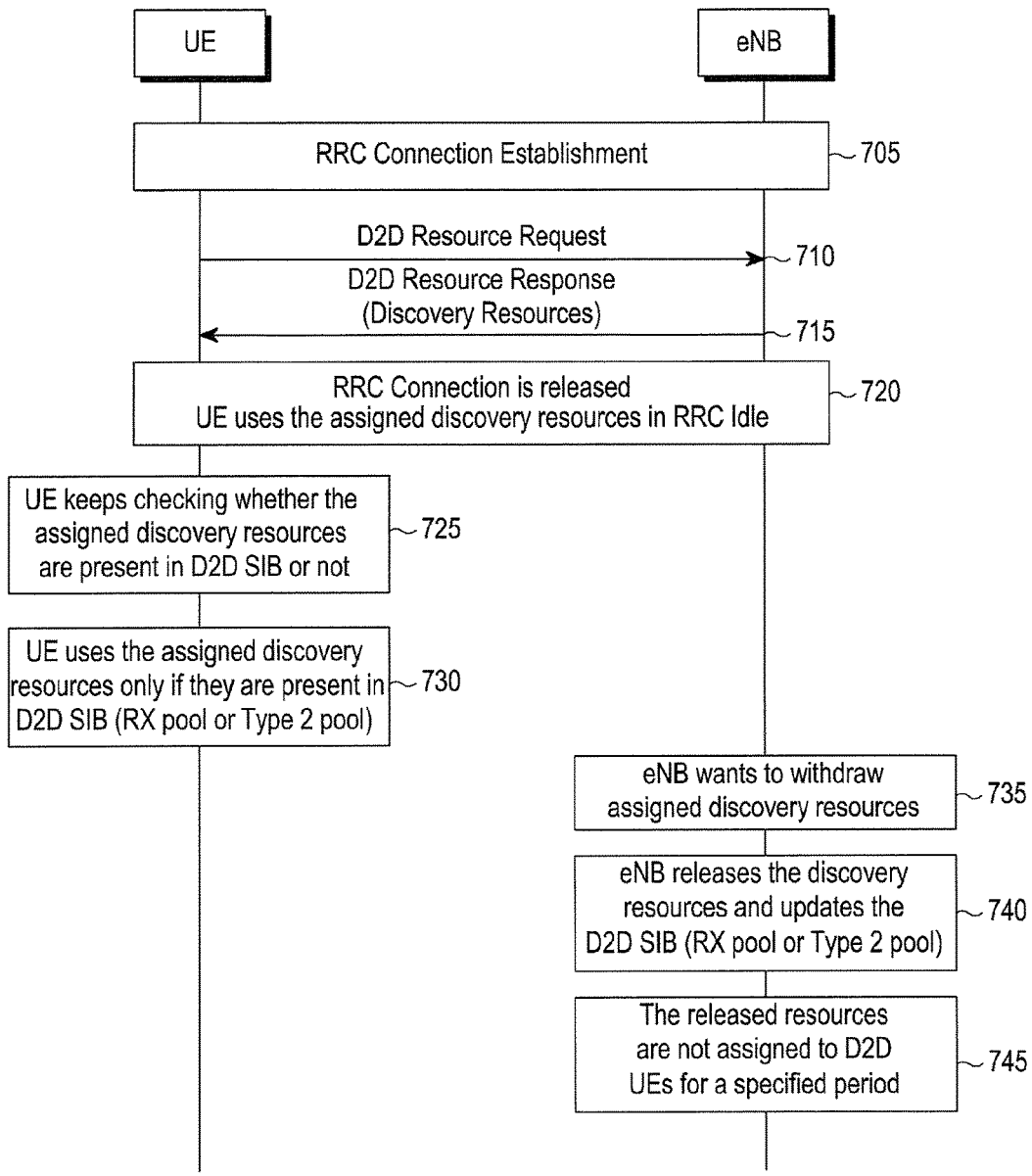
FIG. 7 illustrates a process for releasing D2D resources according to another embodiment of the present disclosure.

FIG. 7 illustrates a process for releasing D2D resources according to an embodiment of the present disclosure.

Referring to FIG. 7, the UE establishes the RRC connection with the eNB in operation 705. In order to establish the RRC connection, the UE transmits the RRC connection request message to the eNB. The eNB responds to the request by transmitting the RRC connection setup message, and establishes the RRC connection for the UE.

The UE transmits the D2D resource request message to the eNB in the RRC connected state in operation 710, and the eNB allocates dedicated resources for D2D transmission, for example, discovery resources to the UE by transmitting the D2D resource response message indicating resources to be used for the discovery transmission to the UE in operation 715. In operation 720, the UE can use the allocated resources for the discovery transmission even after the RRC connection is released.

In operation 725, the UE in the RRC IDLE state inspects whether the allocated dedicated resources exist in reception discovery resources broadcasted by eNB in D2D SIB. eNB broadcasts the reception discovery resources in D2D SIB wherein the reception discovery resources are monitored by D2D UEs for receiving D2D transmissions from other D2D UEs. Only when the allocated resources exist in the reception discovery resources, the UE uses the allocated resources for transmission of the discovery signal in operation 730.

When the allocated dedicated resources do not exist in the reception discovery resources, the UE considers that the allocated dedicated resources are released and it stops using them transmission of the discovery signal.

According to an embodiment, the reception discovery resources are acquired and updated through system information broadcasted from the eNB. The system information can be a D2D System Information Block (SIB) including, for example, information used for D2D communication. The UE can inspect whether the allocated resources exist in the reception discovery resources whenever the reception discovery resource s is updated by the system information transmitting the reception discovery resources. According to an embodiment, the UE can perform the inspection in the IDLE state. According to another embodiment, the inspection can be performed in both the IDLE state and the CONNECTED state.

In operation 735, the eNB can determine to release the allocated resource while the UE uses the allocated resources in the IDLE state. For example, the eNB can determine to withdraw the resources in order to allocate the resources to another UE. In another example, the eNB can determine to withdraw the resources in order to reduce loads and power consumption of the eNB. In another example, when a predetermined time passes after the RRC connection of the UE is released, the eNB can determine to withdraw the resources.

In operation 740, the eNB releases the resources by removing the allocated resources from the reception discovery resources broadcasted in SIB. In a transmission cycle of the system information, the eNB transmits the reception discovery resources in the system information and transmits the system information. The UE detects that the allocated resources do not exist in the reception discovery resources any more from the updated system information and considers that the resources are released. The eNB does not allocate the resources to another UE during a predetermined time after the resources are removed from the reception discovery resources; so as to guarantee that the UE reads the updated system information and the resources are released.

It is noted that two or more of the embodiments can be combined. For example, when the UE moves from one eNB to another eNB, resource release can be initiated by the UE.

Figure 8:
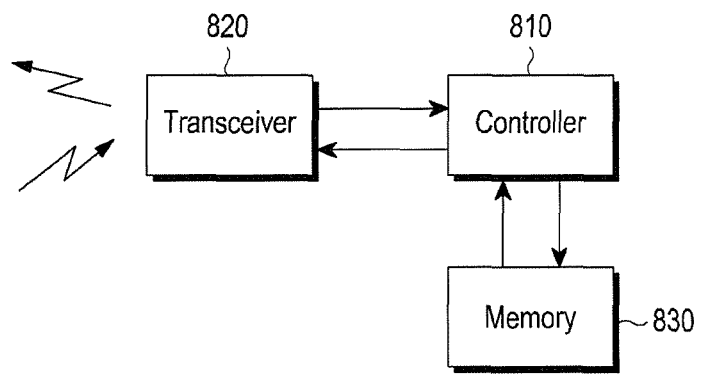
FIG. 8 illustrates a block diagram of a structure of a UE according to an embodiment of the present disclosure.

FIG. 8 illustrates a block diagram of a structure of the UE according to the embodiment of the present disclosure.

Referring to FIG. 8, a transceiver 820 communicates a radio signal with the eNB and/or another D2D UE. A controller 810 controls the transceiver 820 to establish the RRC connection with the eNB and make a request for D2D resources, and performs D2D communication by using resources allocated by the eNB. For example, the controller 810 can transmit a discovery signal for D2D communication through the allocated resources by controlling the transceiver 820. The controller 810 continuously uses the allocated resources for the D2D communication after the RRC connection with the eNB is released. When a message indicating the release of the D2D resources is received from the eNB through the transceiver 820, the controller 810 releases the allocated resources and does not use the resources for the D2D communication any more. A memory 830 stores parameters and program codes used for operations of the controller 810 and the transceiver 820.

According to another embodiment, the controller 810 can be configured to transmit a message making a request for releasing D2D resources allocated by another eNB to the eNB through the transceiver 820.

According to another embodiment, the controller 810 can determine whether the D2D resources allocated by the eNB are continuously effective based on system information acquired from the eNB. When the D2D resources are not effective any more, the controller 810 controls the transceiver 820 to stop the discovery process through the D2D resources.

Figure 9:
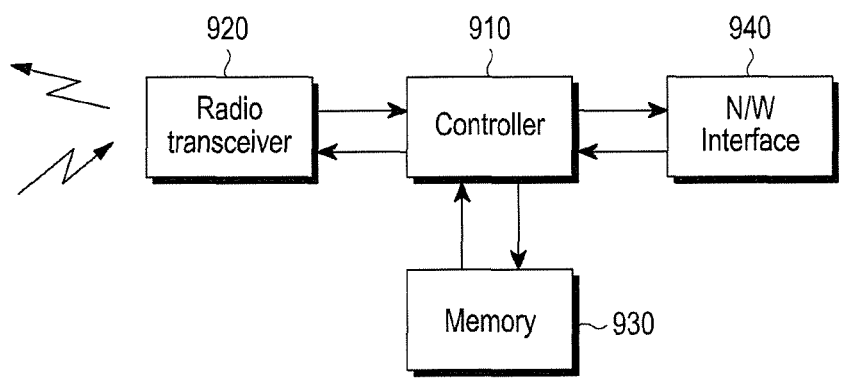
FIG. 9 illustrates a block diagram of a structure of an eNB according to an embodiment of the present disclosure.

FIG. 9 illustrates a block diagram of a structure of the eNB according to an embodiment of the present disclosure.

Referring to FIG. 9, a radio transceiver 920 communicates a radio signal with at least one UE and, and a network interface 940 communicates with a network entity, for example, another eNB and/or an MME.

A controller 910 controls the radio transceiver 920 to establish the RRC connection with the UE and allocate D2D resources, and manages the allocated D2D resources and a mapping table of the UE including the D2D resources. The mapping table can be stored in a memory 930. When it is determined that the RRC connection of the UE including the allocated D2D resources is released and the D2D resources allocated to the UE are withdrawn, the controller 910 transmits a message indicating the release of the D2D resources through the radio transceiver 920. To this end, the controller 910 can make a request for information, for example, paging parameters and UE context used for transmission of the message through a network interface 940. After transmitting the message or a predetermined time passes after the message is transmitted, the controller 910 can release the D2D resources and allocate again the resources for another purpose as necessary. A memory 930 stores parameters and program codes used for operations of the controller 910 and the transceiver 920.

According to another embodiment, when a message making a request for releasing specific D2D resources or D2D resources of a specific UE are received through the network interface 940, the controller 910 can be configured to release the corresponding D2D resources.

According to another embodiment, the controller 910 can insert information indicating the D2D resources allocated to at least one UE for the D2D communication into system information and broadcast the system information. When it is determined to release the D2D resources, the controller 910 removes the information from the broadcasted system information.

Although the present disclosure has been described with an exemplary embodiment, various changes and modifications may be suggested to one skilled in the art. It is intended that the present disclosure encompass such changes and modifications as fall within the scope of the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of managing resources for device to device (D2D) communication by a user equipment (UE), the method comprising:
    establishing a radio resource control (RRC) connection with a base station, the RRC connection having a connection type for D2D discovery;
    transmitting, by the UE, a D2D resource request message to the base station through the RRC connection;
    receiving, by the UE, information of resources allocated for the D2D discovery from the base station through the RRC connection;
    performing, by the UE, the D2D discovery on resources allocated for the D2D discovery after the RRC connection is released and the UE enters in an idle state;
    when a paging message including a reason code indicating a release of the resources allocated for the D2D discovery and resource information indicating at least a portion of the resources allocated for the D2D discovery is received from the base station while the UE is in the idle state, releasing the at least a portion of the resources allocated for the D2D discovery indicated by the resource information; and
    when the UE performs a cell reselection and moves to a new base station after the RRC connection is released and the UE enters the idle state, releasing the resources allocated for the D2D discovery and transmitting, to the new base station, a D2D resource release message for requesting a release of the resources allocated for the D2D discovery,
    wherein the paging message is transmitted on a control channel and is masked by a radio network terminal identifier of the UE.

2. The method of claim 1, wherein performing of the D2D discovery comprises transmitting a discovery signal by using the allocated resources.

3. The method of claim 1, wherein the paging message includes at least one of an identification of the UE, a reason indicating the release of the resources, and resource information indicating the resources to be released.

4. The method of claim 1, wherein the paging message is transmitted repeatedly by a predetermined number of times.

5. The method of claim 1, wherein the D2D resource release message includes at least one of an identification of the UE and an identification of the base station allocating the resources.

6. A method of managing resources for device to device (D2D) communication of a user equipment (UE) by a base station, the method comprising:
    establishing a radio resource control (RRC) connection with the UE, the RRC connection having a connection type for D2D discovery;
    receiving, by the base station, a D2D resource request message from the UE through the RRC connection;
    transmitting, by the base station, information of resources allocated for the D2D discovery to the UE through the RRC connection;
    maintaining a mapping of resources allocated for the D2D discovery and an identification of the UE;
    when the base station determines a release of the resources allocated for the D2D discovery after the RRC connection is released, transmitting, to the UE, a paging message including a reason code indicating the release of the resources and resource information indicating at least a portion of the resources allocated for the D2D discovery and releasing the at least a portion of the resources indicated by the resource information; and
    when a D2D resource release message for requesting a release of the resources allocated for the D2D discovery is received from a neighbor base station which the UE performs a cell reselection and moves to the neighbor base station after the RRC connection is released and the UE enters an idle state, releasing the resources, wherein the paging message is transmitted on a control channel and is masked by a radio network terminal identifier of the UE.

7. The method of claim 6, wherein the allocated resources for the D2D discovery are used for transmitting a discovery signal.

8. The method of claim 6, wherein the paging message includes at least one of the identification of the UE, a reason indicating the release of the resources, and resource information indicating the resources.

9. The method of claim 6, wherein the paging message is transmitted repeatedly by a predetermined number of times.

10. The method of claim 6, wherein the D2D resource release message includes at least one of the identification of the UE and an identification of the base station allocating the resources.

11. The method of claim 6, further comprising:
acquiring a temporary identification of the UE while the RRC connection is established;
receiving information related to the UE from a mobile management entity (MME); and
when it is determined that the UE includes a D2D capability or the UE is authenticated for the D2D discovery based on the information related to the UE, managing a mapping table of the temporary identification and the resources allocated to the UE.

12. An apparatus of a user equipment (UE) for managing resources for device to device (D2D) communication, the apparatus comprising:
a transceiver configured to communicate at least one radio resource control (RRC) signal with a base station; and
a controller configured to control the transceiver, to:
establish a RRC connection with the base station, the RRC connection having a connection type for D2D discovery;
transmit a D2D resource request message to the base station through the RRC connection;
receive information of resources allocated for the D2D discovery from the base station through the RRC connection;
perform the D2D discovery on the resources allocated for the D2D discovery after the RRC connection is released and the UE enters in an idle state;
when a paging message including a reason code indicating a release of the resources allocated for the D2D discovery and resource information indicating at least a portion of the resources allocated for the D2D discovery is received from the base station while the UE is in the idle state, release the at least a portion of the resources allocated for the D2D discovery indicated by the resource information; and
when the UE performs a cell reselection and moves to a new base station after the RRC connection is released and the UE enters the idle state, release the resources allocated for the D2D discovery and transmit, to the new base station, a D2D resource release message for requesting a release of the resources allocated for the D2D discovery,
wherein the paging message is transmitted on a control channel and is masked by a radio network terminal identifier of the UE.

13. An apparatus of a base station for managing resources for device to device (D2D) communication of a user equipment (UE), the apparatus comprising:
a transceiver configured to communicate at least one radio resource control (RRC) signal with the UE; and
a controller configured to control the transceiver to:
establish an RRC connection with the UE, the RRC connection having a connection type for D2D discovery;
receive a D2D resource request message from the UE through the RRC connection;
transmit information of resources allocated for the D2D discovery to the UE through the RRC connection;
maintain a mapping of the resources allocated for the D2D discovery and an identification of the UE;
when the base station determines a release of the resources after the RRC connection is released, transmit, to the UE, a paging message including a reason code indicating the release of the resources and resource information indicating at least a portion of the resources allocated for the D2D discovery allocated for the D2D discovery and releasing the at least a portion of the resources indicated by the resource information; and
when a D2D resource release message for requesting a release of the resources allocated for the D2D discovery is received from a neighbor base station which the UE performs a cell reselection and moves to the neighbor base station after the RRC connection is released and the UE enters an idle state, release the resources allocated for the D2D discovery,
wherein the paging message is transmitted on a control channel and is masked by a radio network terminal identifier of the UE.

* * * * *